ated August 9, 1966

3,265,651
POLYSULFIDE-NEUTRALIZED PINE TAR COMPOSITIONS

Leonard H. Doppler, Peabody, and John F. Hardy, Andover, Mass., assignors to Cabot Corporation, Boston, Mass., a corporation of Delaware
No Drawing. Filed Sept. 3, 1964, Ser. No. 394,342
7 Claims. (Cl. 260—24)

The invention relates to novel compositions of matter based on polysulfide polymers.

Polysulfide polymers are valuable compositions of commerce which when cured are effective substitutes for natural and synthetic rubbers in diverse specialized applications since the cured elastomeric product manifests excellent resistance to oils, solvents, mild acids, alkalies, oxidation, ozone and weathering; together with good moisture and gas impermeability; excellent low temperature properties; and good dielectric characteristics. Accordingly, cured polysulfide polymers can be fabricated into products useful in such applications as sealants, and gaskets in aircraft, automobiles, ships, buildings, machines, and many other items.

A principal object of the present invention is to provide improved compositions based on polysulfide polymers.

Another object of the present invention is to provide relatively inexpensive compositions based on polysulfide polymers which compositions retain essentially unimpaired the outstanding properties and characteristics of polysulfide polymers.

Still other objects and advantages of the present invention will in part appear hereinafter or will in part be apparent to those well skilled in the art.

It would be most desirable to include pine tar among the useful extenders for polysulfide polymers. Not only would the cost of polysulfide compositions be significantly reduced but also the pine tar could effectively mask the offensive odor normally characteristic of polysulfide polymers. However, it is known that pine tar and other naval stores products normally deleteriously affect the properties of polysulfide polymers and accordingly, compositions comprising a polysulfide polymer and pine tar are not considered acceptable for many purposes. In accordance with our invention, we have discovered that a partially neutralized pine tar is an especially compatible extender for polysulfide polymers and that compositions comprising a polysulfide polymer and partially neutralized pine tar manifests properties which are generally equivalent and oftentimes superior to properties of nonextended polysulfide polymers. Accordingly, the novel compositions of the present invention comprise two essential ingredients: a polysulfide polymer and a specially treated pine tar.

Organic polysulfide compounds are normally formed by the reaction of an inorganic alkaline polysulfide and alkaline hydrosulfide mixture with organic compounds having two or more negative radical substituents which are removable by reaction with the inorganic alkaline polysulfide. U.S. Patent No. 2,402,977 describes in more detailed fashion, the manner of forming the organic polysulfide polymers of interest to the present invention and the ingredients involved in the formation thereof. Specific examples of commercial polysulfide polymers that can be employed in the practice of the present invention include those marketed under such trade names as "Thiokol LP-2," "Thiokol LP-3," "Thiokol LP-8" and "Thiokol LP-33." These commercial polymers can be represented by the general formula:

HS($C_2H_4$—O—$CH_2$—O—$C_2H_4$
—S—S)$_x C_2H_4$—O—$CH_2$—O—$C_2H_4$—SH where X is an integer such that the total molecular weight is between about 500 and about 6000. They differ primarily in molecular weight, cross-linking and viscosity as evidenced by the following data:

| Resin | Molecular Weight | Percent Cross-linking | Viscosity in centipoises at 27° C. |
|---|---|---|---|
| Thiokol LP-2 | 4,000 | 2 | 35,000–45,000 |
| Thiokol LP-3 | 1,000 | 2 | 700–1,200 |
| Thiokol LP-8 | 500–700 | 2 | 250–350 |
| Thiokol LP-33 | 1,000 | 0.5 | 1,300–1,500 |

Pine tar is a complex mixture of twenty or more compounds and is derived from the destructive distillation of pine tree stumps and/or pine tree heartwood. Recent work in fractionating pine tar indicates that about 25% by weight of the pine tar consists of resin acids such as abietic, dehydroabietic, di-pimaric and iso-7-d-pimaric acids, and about 25% to 35% by weight consists of unidentified phenolics and polymeric phenolics. The remaining portion of the pine tar, about 40%, consists of neutral compounds (ketones, alcohols, hydrocarbons, etc.), none of which alone are present in very large amounts.

Broadly speaking, the present invention contemplates the term pine tar to mean the liquid product obtained from the destructive distillation of pine tree stumps and/or pine tree heartwood. However, in commercial practice the crude pine tar recovered after destructive distillation is normally subjected to a refining operation and those fractions which have boiling points between about 120° C. and 355° C. or somewhat higher represent present commercial pine tars. The viscosity and the specific gravity of the particular fraction will determine its designation for example, as a light, medium or heavy pine tar. The dehydrated material which is removed at temperatures below about 120° C. is generally referred to as the "light ends" and is essentially terpenoid in nature. The present invention contemplates the use of crude pine tar and/or the above mentioned refined fractions. The following table illustrates the properties of various commercially available pine tars.

TABLE I

| | Pine Tar Oil (PT-101) | Light Pine Tar (PT-400) | Medium Pine Tar (PT-600) | Heavy Pine Tar (PT-800) |
|---|---|---|---|---|
| Sp. Gr. at 15° C | 1.030–1.040 | 1.060–1.070 | 1.065–1.075 | 1.075–1.080. |
| Flash Point (Open Cup) | 136° F | 181° F | 257° F | 265° F. |
| Acidity (as Acetic Acid) Max | 0.15% | 0.15% | 0.1% | 0.1%. |
| Viscosity, cps. (Brookfield at 30° C.) | 98–141 [1] | 500–900 [2] | 1,700–2,650 [2] | 3,350–7,400.[2] |
| Acid No | 40–45 | 50–60 | 55–65 | 55–65. |
| (Visual Indicator Method) Color | Golden Brown | Golden Brown | Golden Brown | Golden Brown. |

[1] Spindle No. 1.
[2] Spindle No. 4.

It is to be understood that other resinous products from pine trees having properties somewhat similar to those enumerated above the obtained by way of a solvent extraction process or from gum rosin distillation can oftentimes be used in the practice of our invention. Accordingly, such products are included within the scope of the term "pine tar." However, pine tar produced by destructive distillation is very much preferred.

As will be noted from Table I above, the commercial pine tars presently available are acidic in nature. In accordance with our invention we have found that surprising advantages are obtained when the acidity of the pine tar is reduced somewhat by at least partially neutralizing the pine tar with basic materials. Unlike regular pine tar, said neutralizing pine tar does not normally deleteriously affect the properties of polysulfide polymer compositions and in fact compositions comprising neutralized pine tar and a polysulfide polymer can be satisfactorily cured or hardened at an accelerated rate in the presence of conventional polysulfide polymer curing agents.

The amount of basic material added to the pine tar to effect at least partial neutralization thereof, will depend primarily upon the degree of neutralization desired and upon the particular basic material utilized. The most effective method of determining the amount of a particular basic material to be added to a particular pine tar is to first determine the amount of sodium hydroxide required to completely neutralize a sample of the tar. There follows a suitable procedure for achieving said neutralization with sodium hydroxide:

Accurately weigh a 0.5–1.5 gram sample of pine tar into a small porcelain crucible or glass weighing capsule. Place the crucible and sample into a 250 ml. breaker and dissolve the sample with 100 grams of a 9/1 (by weight) denatured alcohol/distilled water mixture. Allow to stand for 5 to 10 minutes to ensure complete solution.

Standardize a pH meter and immerse the lower portion of each electrode into the solution while stirring constantly and record the burette and pH meter readings. Add sufficient sodium hydroxide initially to bring to pH of the solution to about 8.5. Then reduce the addition of sodium hydroxide to about 10 drops at a time until the end point has been passed, as indicated by a significant decrease in pH change per increment of sodium hydroxide added. Sufficient time must be allowed between additions to permit the electrode system to reach equilibrium before recording pH readings. Continue titrating with 1.0 ml. portions until it becomes apparent that the inflection point has been well defined.

Determine the inflection point (point of maximum change in pH per milliliter of sodium hydroxide) by plotting the pH readings against the milliliters of sodium hydroxide used. The inflection point corresponds to the point of substantially complete neutralization of the pine tar.

Having determined the amount of sodium hydroxide required to completely neutralize a sample of a given pine tar, we then treat the pine tar with any basic material using amounts thereof stoichiometrically equivalent to between about 30 and about 80% and preferably between about 40 and 70% of the total amount of sodium hydroxide required to completely neutralize the pine tar.

Preferably, of course, the partial neutralization of pine tar is best accomplished by treating the pine tar with an aqueous solution of strong base. The most effective and thus especially preferred basic materials are sodium and potassium hydroxide. Other strong basic materials which are suitable for the practice of our invention but which are less preferred because of their low solubility in aqueous solution are calcium, barium and aluminum hydroxides. Mildly alkaline materials such as sodium carbonate, sodium bicarbonate and the like are also often suitable for the practice of the present invention. Normally a solution of the basic material is added to the pine tar and the mixture is agitated for sufficient time to achieve good mixing of the ingredients. The mixing time will vary and will depend primarily on the degree of agitation involved; with good agitation, 10 minutes is sufficient. The mixture is then allowed to settle and the water or liquid removed therefrom generally by distillation.

Some consideration must be given to the residual moisture concentration of some of the partially neutralized pine tars. This is particularly true when the amount of basic material added to the pine tar is equivalent to more than about 50% and especially more than about 60% of the stoichiometric amount of NaOH required to completely neutralize the pine tar. We have found that the moisture content of a so highly neutralized pine tar should be no greater than about 1% by weight in order to maintain the best balance of properties in resulting compositions comprising polysulfide polymers and said highly neutralized pine tar. When the amount of basic material added to the pine tar is not equivalent to more than about 50% of the stoichiometric amount of NaOH required to completely neutralize the pine tar, residual moisture is of less importance. In general, however, it is best to maintain the moisture in partially neutralized pine tars below about 2% by weight.

We found that the optimum amount of partially neutralized pine tar which should be admixed with the polysulfide polymer is between about 10 and about 150 parts by weight per 100 parts of polymer. However, for some purposes substantially higher amounts of partially neutralized pine tar can be utilized although viscosity problems are often presented. Normally, polysulfide polymer/pine tar compositions comprising between about 15 and about 75 parts of partially neutralized pine tar by weight per 100 parts of polysulfide polymer are preferred.

In addition to a polysulfide polymer and neutralized pine tar, the compositions of the present invention can advantageously include fillers. The fillers that can be utilized generally include any finely-divided inorganic solid including clays, silica, titania, alumina, magnesia, carbon blacks and mixtures thereof. Preferably said fillers have an average particle diameter of less than about 1 micron and most preferably less than about 0.5 micron. In general, the amount of filler utilized is between about 5 and about 150 parts by weight per 100 parts of polysulfide polymer, with the preferred concentration being between about 10 and 70 parts of filler.

In accordance with the present invention, we have also discovered that a surprising and frequently very desirable additional acceleration of cure rate can be obtained when the filler utilized is carbon black. Accordingly, carbon black is definitely preferred as a filler. By carbon black we mean products produced by the incomplete combustion and/or cracking of hydrocarbon materials. Thus, for example, materials referred to in the art as acetylene blacks, lamp blacks, channel blacks, furnace blacks, and thermal blacks are all included within the scope of the present invention. It appears, however, that most pronounced accelerating effect is obtained when the finer particle sized carbon blacks are involved. Accordingly, the most preferred carbon black fillers are those having average particle diameters below about 0.1 micron.

In addition to a polysulfide polymer, partially neutralized pine tar and a filler, the compositions of the present invention also normally contain a suitable curing agent. The most widely used curing agents for polysulfide compositions are such compounds as lead dioxide and cumene hydroperoxide which cure polysulfide polymers at room temperature in about 25 hours, and p-quinonedioxime which requires higher temperatures but shorter times. Less widely used curing agents for polysulfide polymers include other metallic oxides, organic peroxides, metallic paint dryers and aldehydes. The particular curing agent utilized is generally not critical and will depend primarily upon the curing characteristics desired and upon the properties required of the ultimate vulcanizate since each curing agent has its own peculiar attributes. However, the most suitable general-purpose curing agent for polysulfides is lead dioxide.

The amount of curing agent utilized in our compositions is not especially critical and will depend in large measure upon the speed and degree of cure desired and the particular curing agent involved. Said amount can vary generally from about 0.1 to about 20 parts by weight of curing agent per 100 parts of polysulfide polymer. For most applications, however, amounts of less than about 10 parts per 100 parts of polymer are suitable.

Since it is well known that polysulfide polymers will co-cure and are compatible with various resins, the compositions of the present invention can also include minor amounts of other resins such as epoxy resins, polyesters, phenol or resorcinol types and mixtures of these. Other incidental ingredient which can be present in the compositions of the present invention are generally any of the ingredients normally utilized in polysulfide compositions as compatible solvents, activators and the like.

In order to demonstrate more clearly the advantages to be obtained from the practice of our invention and to illustrate manners of practicing same, specific examples are presented below. These examples are illustrative in nature and in no way are they to be construed to limit the scope of the present invention beyond those limitations expressly set forth in the appended claims.

EXAMPLE 1

This example illustrates the advantages in the use of a partially neutralized pine tar over the use of normal pine tar in polysulfide compositions. The compositions set forth in Table II below were prepared by mixing Thiokol LP-2 with regular pine tar or with a partially neutralized pine tar on a hot (120° F.) three roll mill. The pine tar included in Compositions 1A and 2A was regular PT-101 having an acid number of about 45 as determined in accordance with the procedure set forth earlier. The pine tar included in compositions 1B and 2B was PT-101 partially neutralized by mixing 200 grams thereof with 250 mls. of 0.5 N NaOH solution. The mixture was then agitated for 10 minutes and thereafter heated at a temperature of about 220° F. until subsequently all of the water had been removed therefrom at which time the residual moisture concentration in said tar was less than 0.6% by weight. The acid number of the partially neutralized pine tar was 24.

TABLE II

| Composition No. | Parts LP-2 | Parts Pine Tar | Parts Partially Neutralized Pine Tar |
|---|---|---|---|
| Control | 100 | 0 | 0 |
| 1A | 100 | 30 | 0 |
| 2A | 100 | 40 | 0 |
| 1B | 100 | 0 | 30 |
| 2B | 100 | 0 | 40 |

7.8 parts by weight of lead dioxide was added to each of the above compositions. Said compositions were then placed in aluminum foil dishes and the Durometer Hardness of each of the compositions was determined at the various intervals of time set forth in Table III below; the following data was obtained:

TABLE III

| Durometer Hardness at— | Control | 1A | 2A | 1B | 2B |
|---|---|---|---|---|---|
| 0.5 hour | [1]S | S | S | 10 | 9 |
| 1 hour | S | S | S | 17 | 18 |
| 2 hours | S | S | S | 18 | 20 |
| 3 hours | S | 4 | S | 18 | 24 |
| 4 hours | S | 5 | 8 | 18 | 25 |
| 5 hours | S | 7 | 8 | 18 | 26 |
| 6 hours | S | 11 | 8 | 25 | 26 |
| 21 hours | 22 | 13 | 8 | 27 | 27 |

[1] S=Too soft to measure.

EXAMPLE 2

This example illustrates the advantages which are obtained when a partially neutralized pine tar and carbon black are included in polysulfide compositions.

The compositions set forth in Table IV below were prepared in accordance with the procedure set forth in Example 1. The polysulfide polymer utilized as Thiokol LP-2 and the carbon black utilized as Sterling R, a gas furnace black. The pine tar included in both compositions was PT-101 having an acid number of about 42 which had been partially, i.e. about 50%, neutralized in accordance with the procedure set forth in Example 1. The acid number of the neutralized pine tar was about 20.

TABLE IV

| Composition No. | Parts Thiokol LP-2 | Parts Sterling R | Parts Neutralized Pine Tar |
|---|---|---|---|
| Control | 100 | 30 | 0 |
| C | 100 | 0 | 20 |
| D | 100 | 30 | 20 |

14 parts of a curing agent comprising by weight 55 parts lead dioxide, 7 parts stearic acid and 38 parts toluol were added to each of the compositions of Table IV. Each composition was then placed in an aluminum foil dish and the Durometer Hardness of each composition was determined at the intervals of time set forth in Table V below. The following data was obtained:

TABLE V

| Composition Number | Shore A Hardness Time (Hours) | | | | |
|---|---|---|---|---|---|
| | ½ | 2½ | 3½ | 5 | 21 |
| Control | [1] | [1] | [1] | [1] | 33 |
| C | [2] | 34 | 35 | 35 | 41 |
| D | 13 | 36 | 40 | 45 | 53 |

[1] Too soft.
[2] Tacky.

Compositions similar to the control above are presently utilized as sealants for automotive windows. The use of such a sealant is considered to offer many advantages both in economy and in adhesion over the conventional rubber gaskets previously utilized. In this application the polysulfide polymer/carbon black composition is laid down in a bead similar to putty on a window sash. The fixed windows are then pressed into place in this bead of sealant and fastened with molding clips. As the polysulfide polymer cures, it forms a tight rubber-like seal around the window. The use of our compositions in such an application will not only offer an additional economic advantage since the relatively expensive polysulfide polymer (currently priced at about $1.00 per pound) is extended with a comparatively inexpensive material, e.g. partially neutralized pine tar.

Many modifications in the incidental features offered to illustrate our invention will be obvious to those skilled in the art and may be substituted into the present disclosure without departing from the spirit and scope of our invention. Accordingly, it is intended that the present disclosure be regarded as illustrative and as in no way limiting the scope of the present invention.

Having described our invention what we declare as new and desire to secure by U.S. Letters Patent is as follows:

1. A composition of matter comprising a polysulfide polymer and a pine tar which has been partially neutralized by addition thereto of between about 30% to 80% of the total amount of a basic material selected from the group consisting of metal hydroxides and metal carbonates required to completely neutralize the untreated tar.

2. A composition as defined in claim 1 wherein said basic material is selected from the group consisting of the hydroxides of sodium, potassium, calcium, barium and aluminum.

3. The composition of claim 1 which includes a curing agent for said polysulfide polymer.

4. The composition of claim 1 wherein said curing agent is an oxide of lead.

5. The composition of claim 1 wherein said pine tar is present in an amount between about 10 and about 150 parts by weight per 100 parts of said polysulfide polymer.

6. The composition of claim 5 wherein a finely-divided filler is present in an amount between about 5 and about 150 parts by weight of said polysulfide polymer.

7. The composition of claim 6 wherein said filler is chosen from the group consisting of carbon black, silica, titania, calcium carbonate, clays, wollastonite, alumina and mixtures thereof.

References Cited by the Examiner

UNITED STATES PATENTS

| 2,216,044 | 8/1940 | Patrick | 260—79.1 |
|---|---|---|---|
| 2,452,083 | 10/1948 | Grotehuis | 260—79.1 |
| 2,466,963 | 4/1949 | Patrick et al. | 260—79.1 |
| 3,012,487 | 12/1961 | Mika | 260—28 |

FOREIGN PATENTS

| 483,649 | 5/1952 | Canada. |
|---|---|---|

LEON J. BERCOVITZ, *Primary Examiner.*

DONALD E. CZAJA, *Examiner.*

F. McKELVEY, *Assistant Examiner.*